United States Patent
Abello et al.

(10) Patent No.: US 6,781,599 B2
(45) Date of Patent: Aug. 24, 2004

(54) SYSTEM AND METHOD FOR VISUALIZING MASSIVE MULTI-DIGRAPHS

(75) Inventors: James Abello, Bedminister, NJ (US); Jeffrey Korn, Princeton, NJ (US)

(73) Assignee: AT&T, Bedminster, NJ (US)

( * ) Notice: Subject to any disclaimer, the term of this patent is extended or adjusted under 35 U.S.C. 154(b) by 0 days.

(21) Appl. No.: 09/754,173

(22) Filed: Jan. 4, 2001

(65) Prior Publication Data
US 2002/0154175 A1 Oct. 24, 2002

(51) Int. Cl.[7] .............................................. G06T 11/60
(52) U.S. Cl. ........................................................ 345/629
(58) Field of Search .................................. 345/629, 440

(56) References Cited

U.S. PATENT DOCUMENTS

| | | | | |
|---|---|---|---|---|
| 5,450,535 A | * | 9/1995 | North | 345/440 |
| 5,835,085 A | * | 11/1998 | Eick et al. | 345/853 |
| 5,912,674 A | * | 6/1999 | Magarshak | 345/440 |
| 6,100,901 A | * | 8/2000 | Mohda et al. | 345/440 |
| 6,307,573 B1 | * | 10/2001 | Barros | 345/764 |
| 6,308,177 B1 | * | 10/2001 | Israni et al. | 707/100 |
| 6,321,158 B1 | * | 11/2001 | DeLorme et al. | 701/201 |
| 6,415,227 B1 | * | 7/2002 | Lin | 701/213 |
| 6,424,911 B2 | * | 7/2002 | Yamashita et al. | 701/208 |
| 6,456,997 B1 | * | 9/2002 | Shukla | 707/1 |
| 6,476,814 B1 | * | 11/2002 | Garvey | 345/440 |

* cited by examiner

Primary Examiner—Don Wong
Assistant Examiner—Huedung X. Cao (57) ABSTRACT

In accordance with a feature of the invention, a hierarchy of multi-digraph layers may be constructed on top of an input multi-digraph. Each layer represents a multi-digraph obtained from an equivalence relation defined on the edge set of the input multi-digraph. In accordance with a further feature of the invention, each subgraph is small enough to be represented visually in a variety of novel ways.

9 Claims, 10 Drawing Sheets

FIG. 11

SYSTEM AND METHOD FOR VISUALIZING MASSIVE MULTI-DIGRAPHS

FIELD OF THE INVENTION

The present invention relates generally to data processing and visualization and, more particularly, to the analysis of massive multi-digraphs.

BACKGROUND OF THE INVENTION

Massive data sets bring with them a series of special computational and visual challenges. Many of these data sets can be modeled as very large but sparse directed multi-digraphs with sets of edge attributes that represent particular characteristics of the application at hand. Geographic information systems, telecommunication traffic, and Internet data are examples of the type of data that can be so modeled. Understanding the structure of the underlying multigraph is essential for storage organization and information retrieval. Unfortunately, traditional methods of dealing with graphs fail miserably when graphs are very large, for a variety of reasons. First, the substantial difference between CPU speeds and external memories causes a severe input/output bottleneck that often requires the use of an external memory algorithm. Second, there is a screen bottleneck when visualizing massive graphs caused by the simple fact that the amount of information that can be displayed at once is ultimately limited by the number of available pixels and the speed at which information is digested by the user.

SUMMARY OF THE INVENTION

In accordance with the invention, the input/output and screen bottlenecks may be dealt with in a unified manner by extracting subgraphs out of very large multi-digraphs. In accordance with a feature of the invention, a hierarchy of multi-digraph layers may be constructed on top of the input multi-digraph. Each layer represents a multi-digraph obtained from an equivalence relation defined on the edge set of the input multi-digraph. Each layer edge represents an equivalence class of edges at the previous layer. In accordance with a further feature of the invention, each subgraph is small enough to be represented visually in a variety of novel ways. Unlike conventional visual graph representations that draw graphs as nodes and edges, the disclosed visualization techniques more easily display dense subsets of edges. Where the vertex sets are hierarchically labeled, it is advantageous to provide hierarchical browsing where representations can be chosen automatically based on the properties of the data.

These and other advantages of the invention will be apparent to those of ordinary skill in the art by reference to the following detailed description and the accompanying drawings.

DETAILED DESCRIPTION

Figure 1:
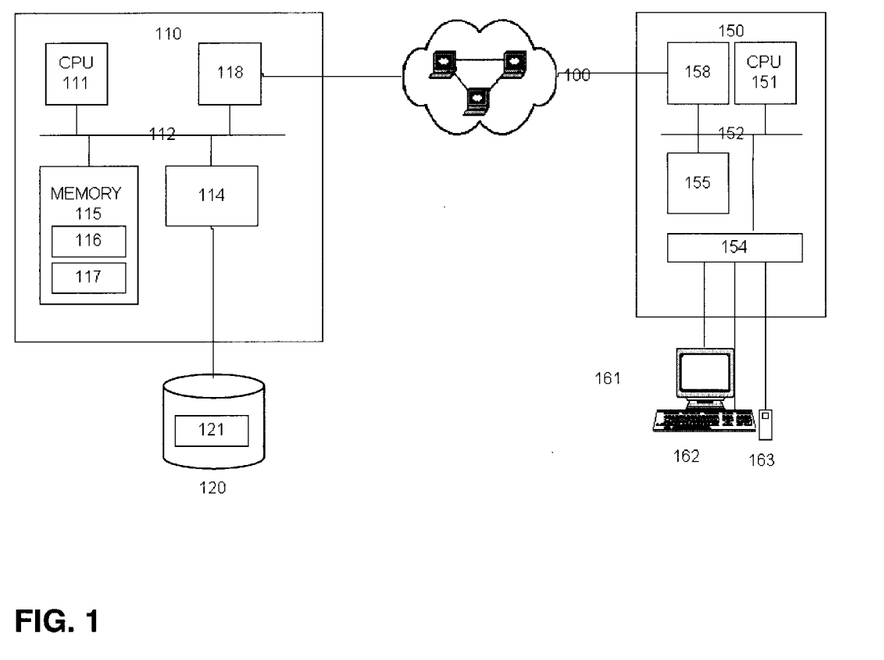
FIG. 1 illustrates a graph visualization system consisting of a graphics terminal connected to a computational server, both embodying principles of the invention.

In FIG. 1, a graph visualization system is shown which advantageously permits one or more graphical terminals 150 to connect across a network 100 to a computational server 110. The functions of the invention are preferably performed by programmed digital computers of a type which are well known in the art, examples of which are shown in FIG. 1. FIG. 1 shows the computational server 110 comprising a system bus 112 connecting a central processing unit 111, a main memory unit 115, a network interface unit 118, and an external device interface 114 connected to some form of non-volatile storage device such as one or more large disk drives 120. The main memory unit 115 includes a storage area 116 for computer program code implementing the computational engine and a storage area 117 for certain data, as further described in detail below. The central processing unit 111 executes the computer program code which is stored in storage area 116 in the memory unit 115. During execution, the processor may access data in the memory unit 115, and may access data stored in the non-volatile storage device 120. The main memory unit 115 may be connected directly to the central processing unit 111 using a separate bus to improve speed and performance, as is well known in the art. The slower non-volatile storage device 120 has a storage area 121 for the multi-digraph to be analyzed. The main memory unit 115 advantageously need not be large enough to store both the edges and vertices of the entire multi-digraph. FIG. 1 also shows a graphical terminal 150 having a display monitor 161, a textual input device such as a computer keyboard 162, and a graphical input device such as a mouse 163. The graphical terminal 150 is another computer system comprising a system bus 152 connecting a central processing unit 151, a main memory unit 155, a network interface unit 158 and one or more external device interfaces 154 to the above-mentioned monitor 161, keyboard 162, and mouse 163. The main memory unit 155 includes a storage area for computer program code implementing a graphical engine and a storage area for data received from the computation server 110, as further described in detail below.

It should be noted that the invention is not limited to the architecture shown in FIG. 1. Although the above embodiment separates the computational engine and the graphical engine so that they execute on different networked computers, they can be made to execute as one or more processes on a single computer and still be within the spirit and scope of the invention. The particular embodiment in FIG. 1 is nevertheless preferred since it permits different users to navigate a massive data set independently. Multiple graphical terminals 150 can connect to and analyze data stored on a centralized server 110 using a common network protocol such as the Hypertext Transfer Protocol (HTTP). Although FIG. 1 shows a mouse/keyboard input interface, it is certainly possible to use a different navigational environment such as a joystick or a more elaborate system tied to some other form of user gestures.

Figure 2:
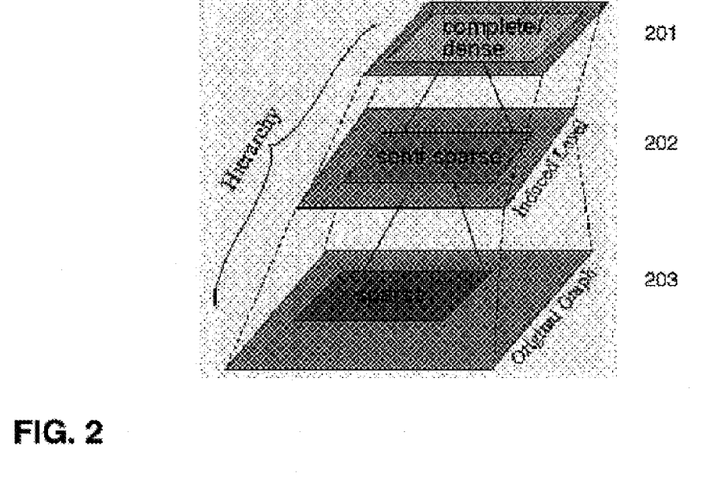
FIG. 2 is a conceptual representation of a hierarchy of graph layers.

FIG. 2 shows a conceptual representation of a hierarchical structure that forms the basis for the visual navigation/browsing described in further detail below. The multi-digraph stored on non-volatile storage device 120 is shown in FIG. 2 as 203. A hierarchy of multi-digraph "layers", e.g. 201 and 202 in FIG. 2 is constructed on top of the input multi-digraph 203. Each layer is obtained by coalescing disjoint sets of vertices at a previous level and aggregating their corresponding weighted edges. Thus, each layer in the hierarchy represents a multi-digraph obtained from an equivalence relation defined on the edge set of the input multi-digraph 203. Each "layer edge" represents an equivalence class of edges at the previous layer. Each such equivalence class is referred to herein as an "edge-slice." Each edge-slice is small enough to represented visually in a variety of ways. The slices have different properties depending on their depth, as shown in FIG. 2. Slices at greater depth can be represented by more pixel hungry representations.

Figure 3:
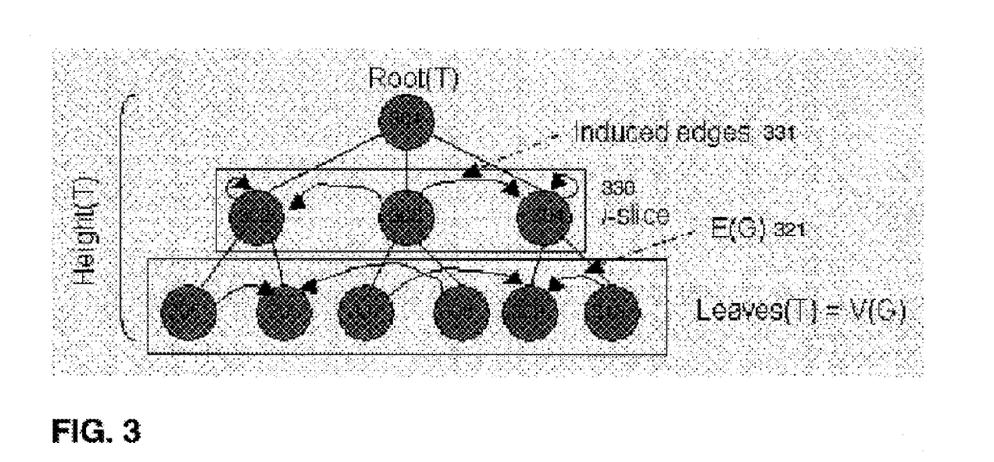
FIG. 3 is a conceptual representation of a hierarchical graph decomposition, in accordance with an embodiment of the invention.

FIG. 3 illustrates the hierarchy in FIG. 2 more formally. A multi-digraph G is referred to herein as a triplet G=(V, E, m) where V(G) and E(G) denote the set of vertices and edges of G respectively and it is assumed that a function m: E→N assigns to each edge a non-negative multiplicity. FIG. 3 shows vertices V(G) 305 through 310 and various edges E(G) indicated as arrows between the vertices, e.g. 321. T is a rooted tree where Leaves(T)=set of leaves of T; Height (T)=maximum distance from a vertex to the root of T; and T(i) is the set of vertices of T at distance i from the root of T. The root of the tree T in FIG. 3 is 301 with T(i) comprising the set of vertices 302, 303, and 304. For a vertex x∈T, let $T_x$ denote the subtree rooted at x. Vertices p and q of a rooted tree T are called "incomparable" in T if neither p nor q is an ancestor of the other. Given a multi-digraph G and a rooted tree T such that Leaves(T)=V(G), as shown in FIG. 3, the multiplicity of a pair of vertices p and q of T is $m(p,q)=\Sigma_{(x,y)\in E(G)}m(x, y)$ for $x\in Leaves(T_p)$ and $y\in Leaves(T_q)$. An incomparable pair (p, q) is referred to herein as a "multi-edge" when m(p, q) is greater than zero. When both p and q are at the same distance from the root of T, the multi-edge is called "horizontal." A "non-horizontal" multi-edge between vertices p and q where p is a leaf Height(q)>Height (p) is referred to as a "primary crossing multi-edge." Note that the horizontal multi-edge (p, p, m(p, p)) represents the subgraph of G induced by Leaves(p) and m(p, p) is its aggregated multiplicity.

FIG. 3 displays what the inventors refer to as the "hierarchical graph decomposition" of G, given by T, which provides a layered view of the multi-digraph. The hierarchical graph decomposition is a multi-digraph H(G, T) with vertex set equal to V(T) and edge set equal to the edges of T union the multi-edges running between incomparable pairs of T. Since H(G, T) contains a very large collection of multi-edges that can be computed from the horizontal and primary crossing multi-edges, it is advantageous to maintain just these multi-edges and compute the remaining ones on demand. This sub-multigraph is denoted by LH(G, T) which can be viewed as a collection of "layers" representing an equivalence relation on E(G). Each layer contains horizontal multi-edges only. The primary crossing multi-edges indicate inter-layer data relations. The "i-layer" of G, shown as 330 in FIG. 3, is the multi-digraph with vertex set T(i) and all the corresponding horizontal multi-edges. For a multi-edge (x, y) of an i-layer, its "edge-slice" is the sub-multigraph of the (i+1)-layer whose nodes are the children of x union the children of y, and whose multi-edges are those in the (i+1)-layer running between these nodes. A good mental picture of what the above conveys is that each multi-edge (p, q) has below it a hierarchy of edge-slices where each level represents an aggregation of previous levels and where the bottom-most level is the subgraph of G with vertices Leaves $(T_p)$ union Leaves$(T_q)$ and edges of G running between them.

The condition that Leaves(T)=V(G) guarantees that every T(i) determines a partition of V(G) with every higher level being just a partial aggregation of this partition. This implies in turn that from any given layer one can move to any of the adjacent layers by partial aggregation or by refinement of some sets in the corresponding partition. This is precisely the information that is encoded in LH(G, T). Namely, from any given multi-edge e in LH(G, T), one can obtain the set of edges in G that are represented by e. This is the only operation that is needed to navigate since vertices in T can be easily replaced by their children by just following the tree edges. Non-primary crossing edges between non-leaves of the tree can be expanded by using the basic operations defined below. The I/O complexity is proportional to the difference in height between the two end points. Thus, the main navigational operations used by the computational engine can be defined as follows:

| | |
|---|---|
| replace (u) | REPLACEMENT: Given a vertex u in T, replace (u) substitutes u by its children. This can be implemented by generating edges $\{(u, u_i): u_i$ is a child of u in T$\}$ and vertices children (u). |
| zoom (u) | VERTEX ZOOM: Given a vertex u in T with children $u_1, u_2, \ldots, u_k$, zoom (u) generates $\{(u, u_i): u_i$ is a child of u in T and pairs $(u_i, u_j)$ such that in the input multi-digraph the set of edges from Leaves $(u_i)$ to Leaves $(u_j)$ is non-empty$\}$. |
| zoom ((u,v)) | EDGE ZOOM: Given an edge (u, v), zoom ((u, v)) is defined as follows: {delete the edge (u, v); replace (u); replace (v); add all the edges in the next layer that run from the children of u to the children of v} |

Suitable inverses of the operations above can be defined provided certain restrictions are obeyed. For example, the inverse of "replace" can be defined, for a set of vertices, only if they are on the same layer and if they constitute all the children of a vertex u.

Figure 4:
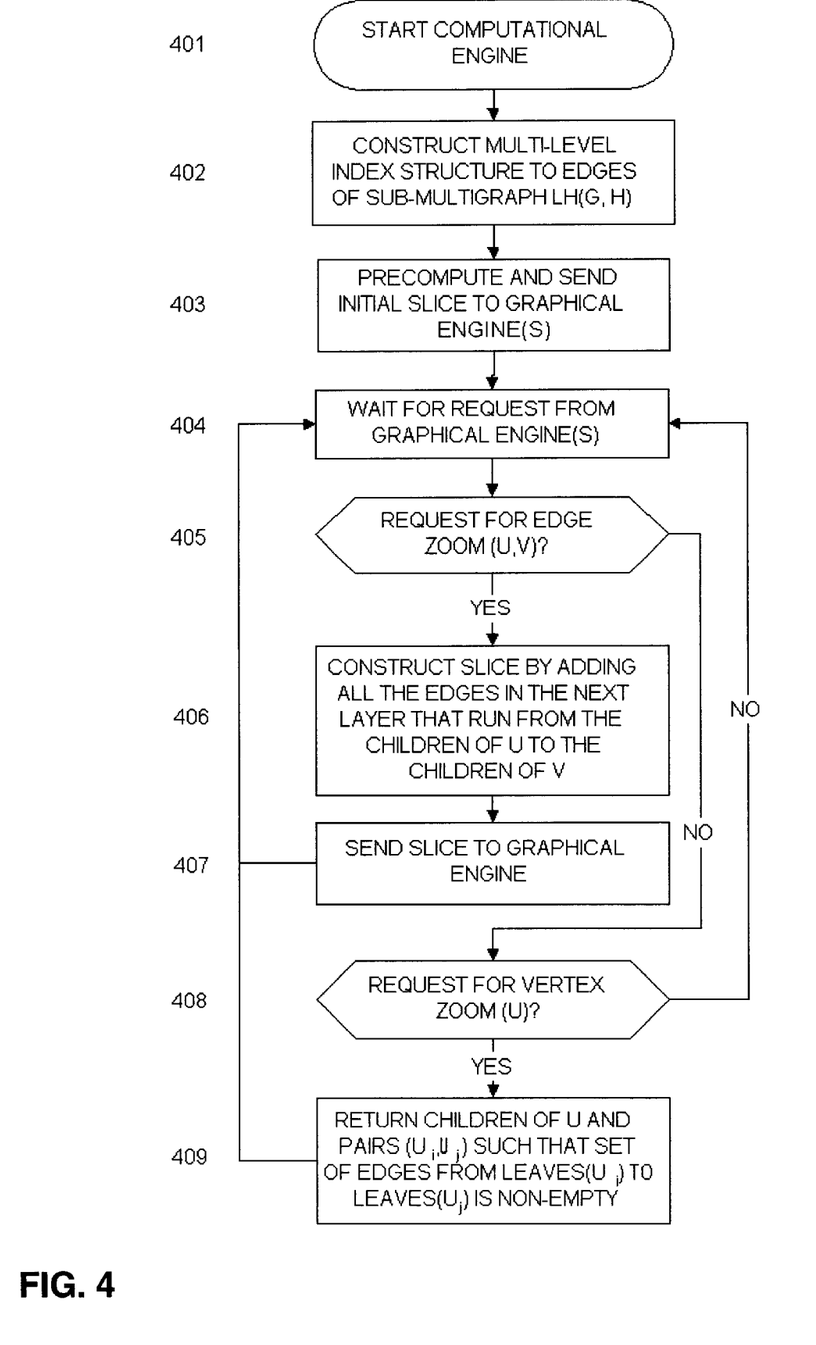
FIG. 4 is a flowchart of processing performed by a computational engine in accordance with an embodiment of the invention.

FIG. 4 is a simplified flowchart of the processing performed by the computational engine in creating the above-described hierarchy and answering queries by the graphical engine. At step 402, the computational engine takes as input a stream of edges representing the multi-digraph G and a rooted tree T and constructs a multi-level index structure to the edges of LH(G, T) that can be stored on the non-volatile storage device 120. LH(G, T) is an efficient data structure for use in the visualization system and can be constructed in a bottom-up fashion, for example using the following algorithm:

Input: G and T such that Leaves (T)=V(G)
Output: An index structure to the edges of LH(G, T)

```
{
    base-multigraph = G;
    j = depth(T);
    for i = j down to 0 do
    {
        B(i) = E(T(i));
        /* Edges in the base graph adjacent to vertices in T(i) */
        G(i) = subgraph of the base multigraph induced by T(i);
        For every edge (u, v) in E(G(i)) do {
            if parent (u) = parent(v) then {
                delete or mark (u,v) from the base multigraph
                and from B(i); place (u,v) in E(i)}
            In the base graph, "replace" all vertices in T(i)
            that have the same parent by their common parent,
            relabel the edges in B(i) accordingly and accumulate
            their multiplicities. For every edge created by this
            process, keep a pointer to the original set of edges
            responsible for its creation.
        }
        add the edges of T;
        Return LH(G, T)
    }
}
```

Because LH(G, T) is really T plus the collection of layers of G given by T, each layer can be thought of as being represented by a two dimensional grid and T as a road map to navigate the slice hierarchy.

As mentioned above, the multi-graph G can be an external memory graph residing on the non-volatile storage device 120. Where T fits in the main memory unit 115, the edges of G can be read in blocks and each one filtered up through the levels of T until it lands in its final layer. This can be achieved in one pass. A variety of index structures can then be used to recover the original edges from their representatives in the slices. Where T does not fit in main memory, but V(G) does, a multilevel external memory index structure can be set up to represent T as a parent array according to pre-computed breadth first search numbers. Filtering the edges through this external representation of T can be done in no more than Height(T) scans over the data. With main memory these days have multi-gigabyte RAMs, one can process in principle any secondary storage multi-digraph defined on hundreds of millions of vertices. Nevertheless, where V(G) does not fit in the main memory, one approach to handling this external memory problem is to fit into main memory as many levels of T as possible, from the root downwards. The remaining levels are then collapsed into the deepest level which does not fit. An external parent array can be made to point then from the deepest level into the last level residing in memory. A suitable index structure into the external parent array can then be used to filter the input edges, one level up, in one pass over the data. The rest of the filtering can then proceed in main memory. The I/O performance depends strictly on the I/O efficiency of the access structure. Another approach is to presort E(G) by the head of each edge, according to the corresponding breadth first search numbers.

At step 403, the computational engine can pre-compute and send an initial slice to the graphical engine(s), thus providing the user with an initial layer for the visualization system. It is advantageous for the server to encode the slice in a standard format such as XML which can then be used by the interface. The computational engine then, at step 404 waits for requests from the graphical engine, for example for either an edge zoom or a vertex zoom in accordance with the navigational operations defined above. Where the computational engine receives a request for an edge zoom at step 405, the computational engine can pre-compute or construct "on the fly" the slice and return the slice to the requesting graphical engine at step 406. The computational engine can similarly pre-compute or construct an answer where the graphical engine requests a vertex zoom at steps 408 and 409. The computational engine advantageously does not need to compute the entire H(G, T) a priori, since it is likely that any given user will only navigate through a subset of the data. The computational engine can run in concert with the visualization interface and act as a server.

Figure 5:
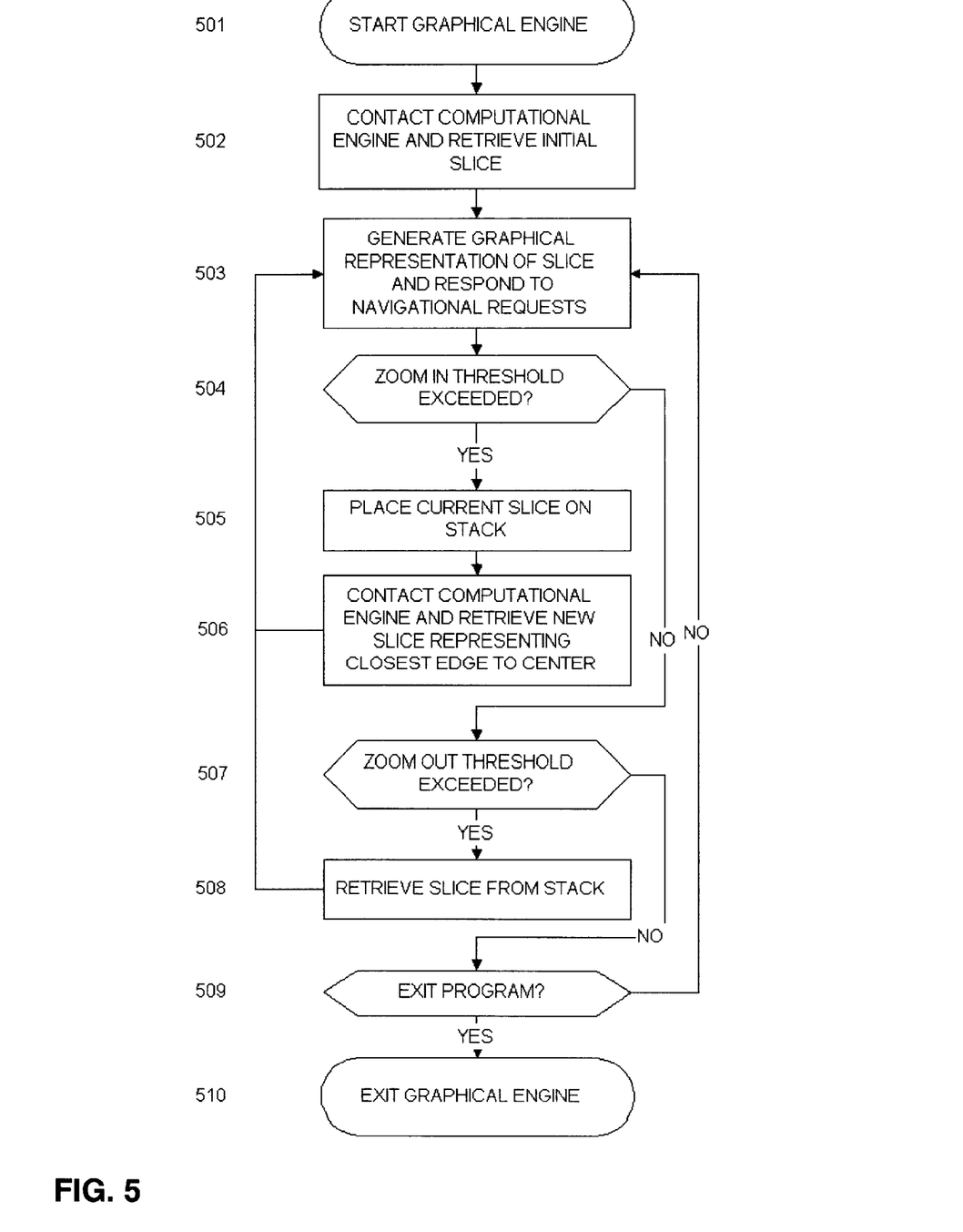
FIG. 5 is a flowchart of processing performed by a graphical engine in accordance with an embodiment of the invention.
Figure 6:
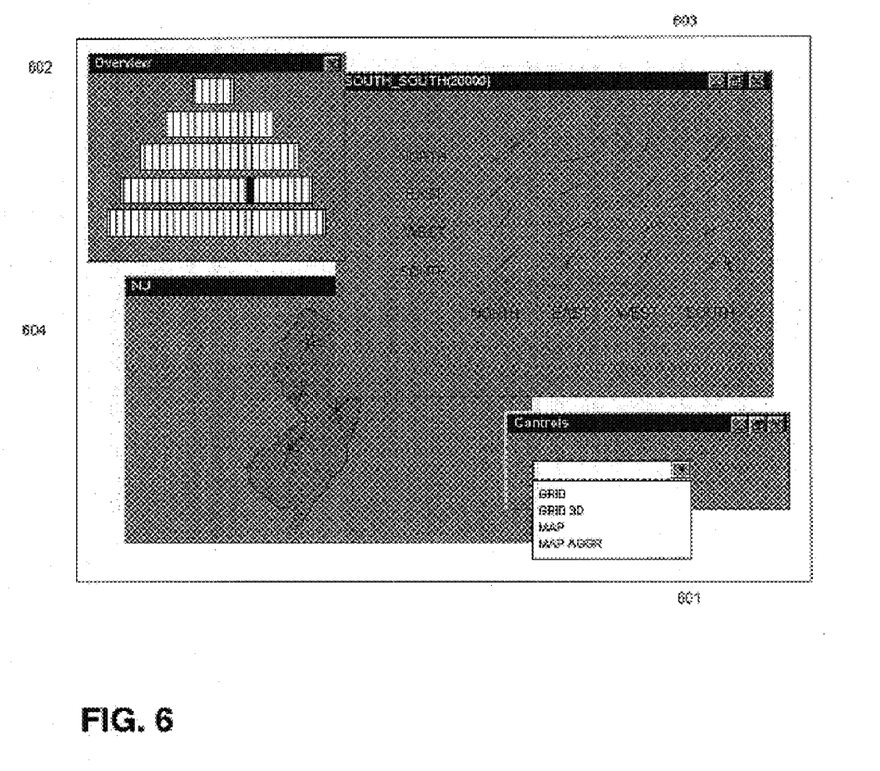
FIG. 6 is a screenshot of a visualization interface, in accordance with an embodiment of the invention.

FIG. 5 is a simplified flowchart of the processing performed by the graphical engine in visualizing slices in the hierarchy. The graphical engine has two primary functions—generating graph representations for individual slices using the navigation operations defined above and displaying appropriate visual cues and labeled text. The interface should help the user gain an intuitive understanding along with complete navigation control. At step 502, the graphical engine obtains the initial slice from the computational engine and proceeds to convert the slice data into a visual representation, which can be navigated by the user. FIG. 6 is an example screenshot of a visualization interface that may be presented on the monitor 161 in FIG. 1. When visualizing data sets that are two to three orders of magnitude larger (say around 250 million records) than the screen resolution (typically about one million pixels) it becomes imperative to use a hierarchical decomposition of the visual space, particularly if real-time interactivity is required. Fast response can be achieved by navigating the input graph via its slices. Window 601 is a control interface that allows the user to choose the particular type of graph slice view, as further described below. Multiple windows showing different graph slice views of the same hierarchical graph slice can be shown by the interface, as shown in FIG. 6 by windows 603 and 604. The best representation for a particular slice depends on the properties of the graph representing that slice, so it is advantageous for the visualization system to allow a variety of visualization techniques to be used for each slice. As the user is viewing a particular slice, the user can use the mouse or keyboard to pan, rotate, or zoom the image. A threshold can be set which defines between which zoom factors the visualization is valid. At step 504 in FIG. 5, if the user zooms far enough in to exceed the threshold, a callback is invoked which replaces the current slice with a new slice. At steps 505 and 506, the computational engine is contacted and a new slice is retrieved representing the closest edge to the center, which is where the user is zooming into, while the slice is placed on a stack. When the user zooms out, at step 507, the corresponding slice can be retrieved from the stack at step 508. The induced hierarchy makes it possible for a user and the graphical engine to digest one manageable portion of the data at a given time.

In the case of highly dense slices, which are usually encountered in higher layers of the slice hierarchy, the inventors have found it often best to use an adjacency matrix style visualization as shown in window 603 since the number of edges is too large to effectively use the traditional nodes-and-edges visualization. The inclination and/or color of the sticks provides a visual cue as to the value associated with the particular edge between the two vertices represented in the matrix. Context can be provided by a window 602 which displays the hierarchy abstractly in the form of a pyramid or tree and highlights nodes that the user has already visited or is currently visiting in different colors. This provides the user with information about how deep they are in the hierarchy. It can also be used as an alternative navigational tool by permitting the user to click on and move to a particular node in the hierarchy. The reduced size of each edge-slice makes it possible to provide the necessary real-time feedback in such an exploratory setting. The graphical engine can track the mouse activity of the user and also can display textual information about the closest vertex (edge of the original graph) in a separate window or in a header at the top of the window. For example, the cursor in FIG. 6 is hovering over the south to south edge in the slice matrix causing the header of the window to reflect "SOUTH_SOUTH(20000)" where the number represents some aggregate raw data figure associated with the particular edge. The user interface can also allow nodes to be selected with the mouse. A list of selected nodes can be maintained by the system, which can be used by the different visualization methods. Typically, the selection is used to display a sub-graph of the current slice. For example, if the user is displaying a graph whose nodes are all states in the US, the user could select a handful of states of interest and limit the display to only those nodes and related edges. When the selection changes on one view of the graph, it is appropriately updated on corresponding linked views. The system automatically tracks the correspondence between edges and visual segments. Thus, the author of a visualization does not have to handle the details of user interaction. The system can determine which edges are selected through the interface. It uses this information to interactively label edges and determine which edges are to be replaced and expanded when the user zooms in. Excessive clutter can be avoided on the display by using a combination of static and dynamic labels. Static labels are displayed at all times. They are usually a very small fraction of the entire label set. The dynamic labels are displayed on the screen only when the user is interested, e.g. during mouse tracking or even retina tracking.

FIGS. 7 through 11 illustrate different novel visualization techniques which the inventors have found to be useful in displaying graph slices. The different representations can be chosen automatically based on properties of the data, or can be plugged in manually by a system user, via the control 601 in FIG. 6. The visualizations use visual metaphors which depart strongly from the conventional visual graph representation that draws graphs as nodes and edges. Conventional graph representations are of very limited use for the range of sizes that can be handled by the present graph visualization system.

Figure 7:
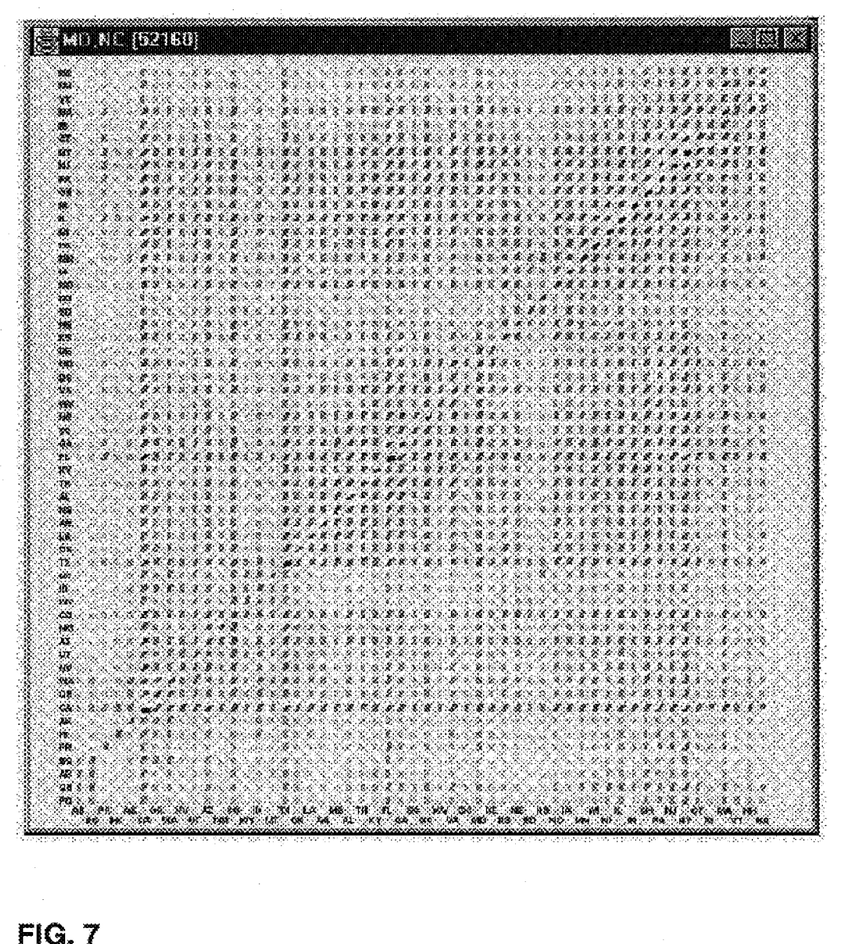
FIGS. 7, 8, 9, 10, and 11 are screenshots of different graph visualizations, in accordance with another embodiment of the invention.

FIG. 7 shows an example of what the inventors refer to as a "needle grid." The graph slice is viewed as a real non-negative matrix A whose entries are normalized in a suitable fashion. Each matrix entry A(i, j) is represented as a vector r(i, j) with origin at (i, j) and whose norm is obtained via a continuous and non-decreasing mapping n. Edge values are shown in FIG. 7 with multiple cues: the segment color, segment length, and segment orientation. The angle ang(i, j) that r(i, j) forms with the horizontal axis x is predetermined by the order of the entries in the matrix A. In FIG. 7 the range of ang(i, j) is constrained to run between $-\pi$ and 0. One such possible mapping n is the one provided by a car speedometer except that now the needle increases in length and/or changes color as it rotates from $-\pi$ to 0. The vector r(i, j) is referred to as the "needle" corresponding to the value A(i, j), and the rectangular grid with the needles placed at their corresponding origins (i, j) is referred to as the "needle-grid" representation of the given matrix or a "needle slice." Note that the grid view for a particular graph is not unique and depends on the ordering of the matrix elements. When the vertices of the multi-digraph have an underlying geographic location, they can be mapped into a linear order, using for example Peano-Hilbert curves, in order to maintain some degree of geographic proximity. In this way, the obtained surface maintains certain degree of correlation with the underlying geography. FIG. 7 shows sets of telephone call data between the different states in the US. Some interesting observations emerge from this visualization. First, it can be seen that there are high values along the diagonal which indicates a higher call volume for interstate calls in general. The order of the matrix elements conforms to a Peano-Hilbert path through the US map. In this way, clusters around the diagonal correspond to country regions with high calling traffic. Asymmetries can also be observed in the edge density, which could reflect differing densities of telephone customers. In general, patterns at higher levels of the hierarchy can be used as exploration guides at lower detail levels.

Figure 8:
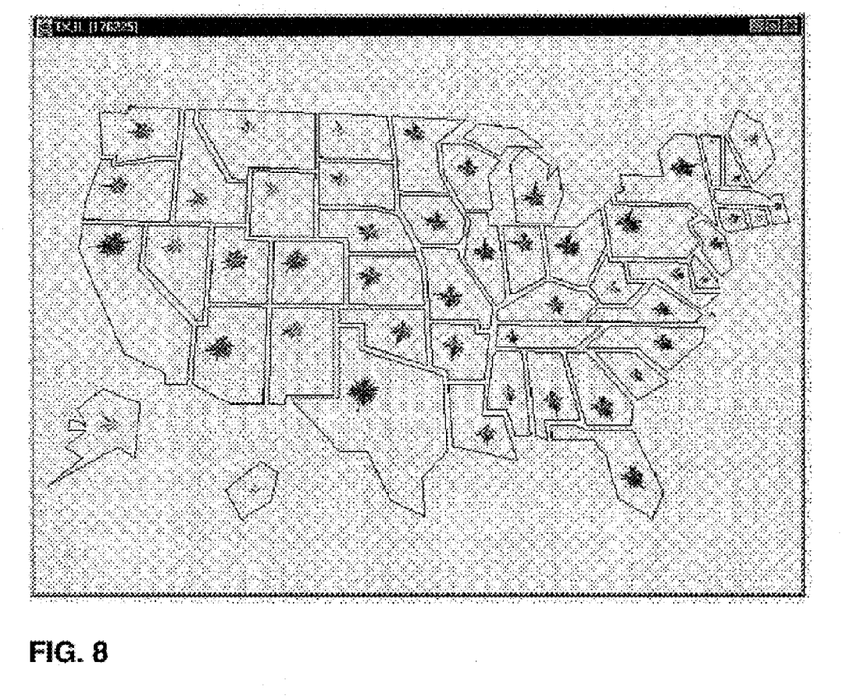

FIG. 8 shows an example of what the inventors refer to as a "star map" view of a graph slice, superimposed with geographical information. The star-map view rearranges each row or column of the above matrix into a circular histogram rooted at a single point. The histogram is arranged such that the first value is drawn at 0 degrees and values are evenly spaced such that the final value is drawn at $2\pi$. This results in a star-like appearance. Each element of the star, referred to herein as a "star segment," has a length proportional to the value of the edge it represents. Additionally, the color of the star segment can be dependent on the value to provide an additional visual cue. Each star represents a row or column, depending on which type of star visualization is chosen. The position in which each star is placed is arbitrary; however, if available, geographic data associated with each node in the graph can be used in deciding the position of a star. The position of the star segments can also be chosen in a way that directly or roughly reflects the geographical direction of the particular edge represented. As an example, FIG. 8 visualizes telephone call detail data, where each node in the slice represents a particular state in the US. The latitude and longitude for each node can be supplied and the stars arranged as shown in FIG. 8. Each star representing a row (or column) j is placed at the geographic position of j. The star-map conveys a different type of information than the needle grid in FIG. 7. It is particularly well-suited to focus on a particular subset of vertices and detect easily among them those with higher or lower incoming or outgoing traffic. By moving the mouse over the segments, the corresponding vertex labels get activated. In the call detail data, it can be noticed that there are some states with one or two star segments that are larger than the others. Moving the mouse over the segments reveals which states these are.

Figure 9:
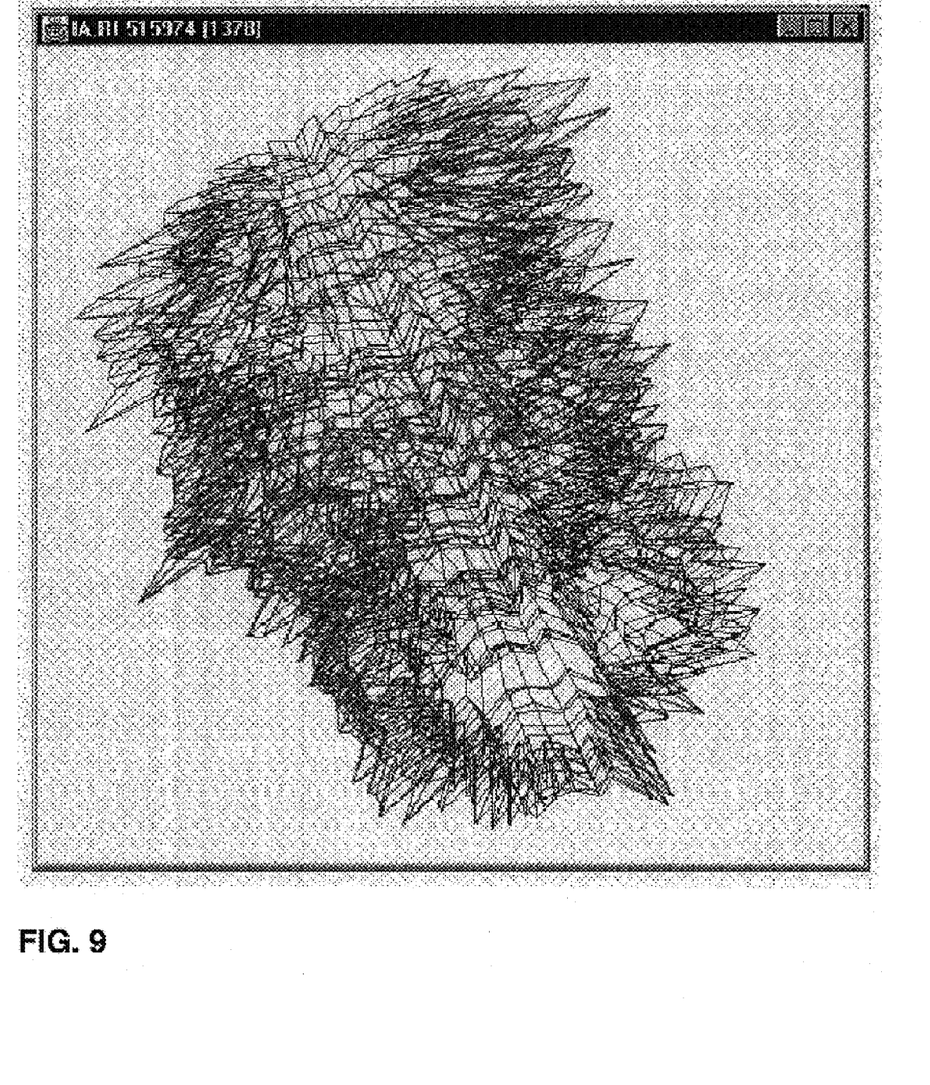

FIG. 9 shows an example of what the inventors refer to as a "multi-comb" view of a graph slice, which can be thought of as an extension of the star map. With star maps, an entire row or column of the matrix is drawn such that it appears as a single object, roughly in the shape of a star, but it represents a collection of values. Taking this a step further, the entire matrix can be turned into a "single" object by placing the collection of stars that compose the matrix on tope of each other along the z axis and connecting the endpoints of the corresponding star segments. The single object in FIG. 9 represents an aggregate view of a graph with hundreds of millions of edges. An advantage of this view is that rows or columns can be compared depending on if the view is oriented along the star segments at a particular z or if all the z values for a particular star segment are looked at (when considering all the z values for a single star segment, it resembles a comb; hence the name for the view). This view is also useful in providing animations of data set evolution.

Figure 10:
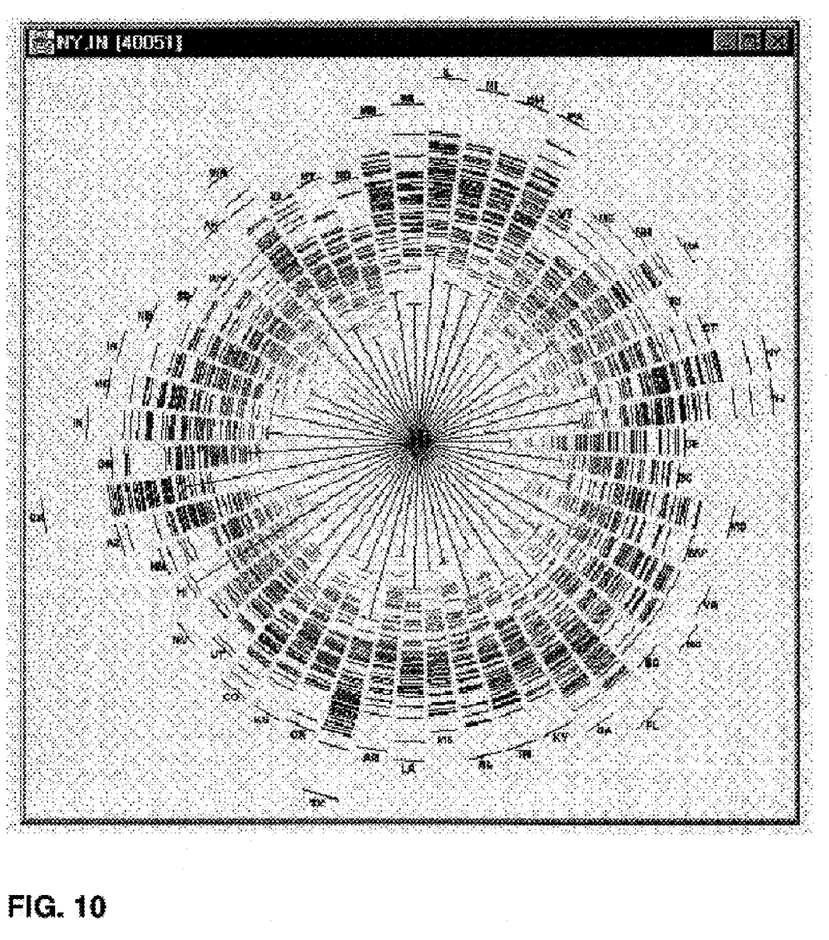

FIG. 10 shows an example of what the inventors refer to as a "multi-wedge" view of a graph slice. The multi-wedge view is a different way to overlay stars on top of each other. Instead of putting each star at a different z value as done with the multi-comb, a single star is drawn as ticks instead of segments, where each tick is placed at the endpoint of that segment. The resulting picture, as shown in FIG. 10, is a circular histogram with a distribution spectrum on each star segment, which the inventors refer to as a "wedge." From this view, the minimum and maximum values for a star line (which is a row or column), standard deviation, median, mean, etc., can be seen. This is a two dimensional view, which is preferable to the multi-comb for static visualizations. The colors of the ticks can represent the value of the back-edge in the multi-graph. When the matrix is symmetrical, the colors of ticks will occur in order. Thus, asymmetries in the coloring convention can be easily detected. In FIG. 10, the calling distributions for each state can be analyzed. It can be seen again that intrastate calling is typically a lot greater than interstate calling, but this view reveals the rest of the distribution varies a lot by state. Looking at the distributions can tell the user which states have more regional calling patterns. For example, North Dakota makes a lot more calls to Minnesota than to any other state, but California has a more even distribution to the other states. The northern states of Idaho, Montana, and North Dakota can also be seen to have lower phone usage than neighboring states.

Figure 11:
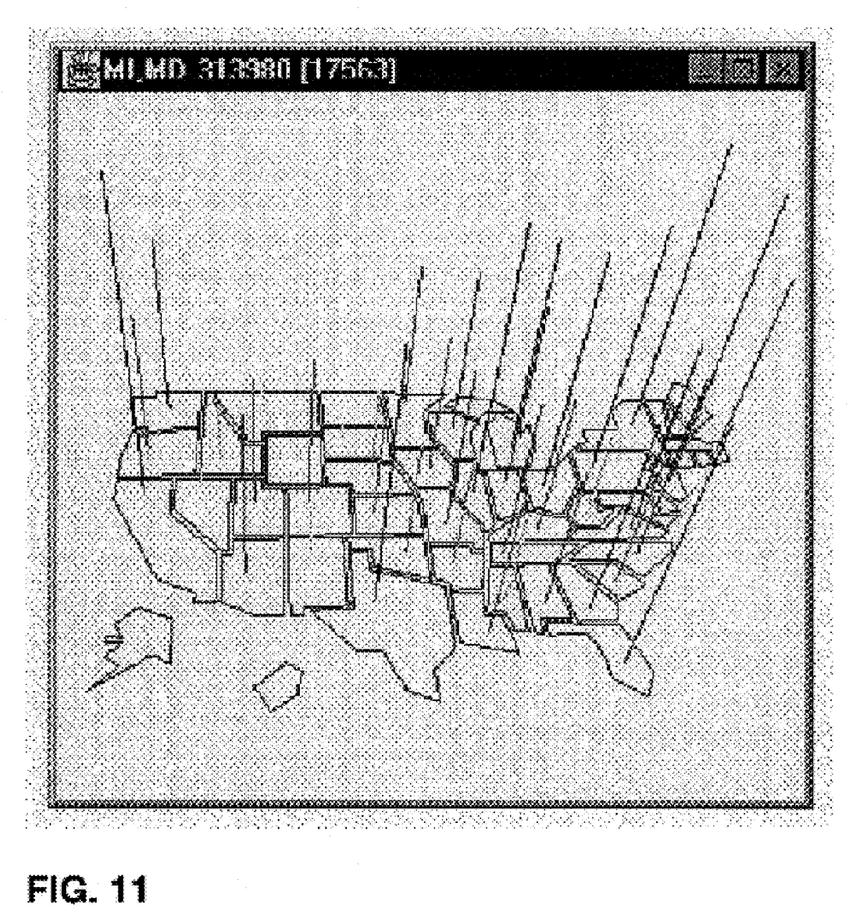

FIG. 11 shows an example of an aggregate view. Although each matrix entry is typically mapped to exactly one screen segment, it is possible to create mappings which effectively compute certain aggregate operations. FIG. 11 takes the information reflected in the FIG. 7 star map and replaces the stars with a single bar representing their aggregate equivalent. This is accomplished by creating bar segments for each star and placing them on top of each other along the z direction. The resulting view will appear as a single bar representing the sum of values for that row (or column) as shown in FIG. 11. Additionally, a user can move the cursor on the bar to find out what are the segments that make up the bar and can zoom in on a particular segment. More complicated aggregations are possible, such as taking the mean, median, or an arbitrary function over the values. This can be accomplished by mapping the slice into a new slice representing the aggregation and visualizing the slice. For example, if the user wanted to visualize the average over each row, an m*n slice would be mapped into an m*1 slice. The system can provide a mechanism to define slice transformations, which are useful in other contexts as well. For instance, suppose the user is only interested in a subset of the vertices. The slice mapping can be used to select out only the nodes of interest. The transformations can also be used to rearrange the vertex ordering.

The navigation operations can be enhanced to perform a variety of statistical computations in an incremental manner. They can also be used to animate behavior through time. The stars-map metaphor is very useful when the vertices of the multi-digraph have an underlying geographic location, e.g. FIG. 7. This offers a high degree of correlation between graph theoretical information and the underlying geography. Although the examples shown in the above-mentioned figures focus on visualizing call detail data, they can be used with a variety of other data sets as well, e.g., citation indexes, general library collections, program function call graphs, file systems, internet router traffic data, etc. Internet data, for example, is a prime example of a hierarchically labeled multi-digraph that fits quite naturally into the graph metaphor. Each "slice" represents traffic among the aggregate elements that lie at the particular level of the hierarchy, such as IP address blocks or the domain name space. Web pages can also be modeled as nodes and hyperlinks as edges, thus taking a set of web pages as a digraph. A portal which categorizes web sites into a hierarchy can be used as the tree.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method of processing an input multi-digraph comprising:

constructing a hierarchy of multi-digraph layers on top of the multi-digraph, where a multi-digraph layer is a multi-digraph obtained from an equivalence relation defined on an edge set of the input multi-digraph, which multi-digraph layer is obtained by coalescing disjoint sets of vertices at a previous layer and aggregating their corresponding weighted edges, and where a first layer is obtained by coalescing disjoint sets of vertices of said input multi-digraph and aggregating their corresponding weighted edges;

extracting a graph slice from the hierarchy; and creating a visual representation of the graph slice.

2. The invention of claim 1, wherein each layer has edges representing an equivalence class of edges at a previous layer.

3. The invention of claim 1 further comprising the steps of:

receiving input from a user;

replacing the graph slice with a second graph slice extracted from the hierarchy; and creating a visual representation of the second graph slice.

4. The invention of claim 1 wherein amount of storage needed for storing the input multi-digraph in a computer that includes a main memory and a bulk storage means is larger than the main memory.

5. A system for visualizing an input multi-digraph that includes a maim memory and a bulk storage device comprising:

a computational engine enabled to construct a hierarchy of multi-digraph layers on tap the multi-digraph and to extract graph slices from the hierarchy, where a multi-digraph layer is a multi-digraph obtained from an equivalence relation defined on an edge set of the input multi-digraph, which multi-digraph layer is obtained by coalescing disjoint sets of vertices at a previous layer and aggregating their corresponding weighted edges, and where a first layer is obtained by coalescing disjoint sets of vertices of said input multi-digraph and aggregating their corresponding weighted edges; and a graphical engine coupled to said main memory in communication with the computational engine and enabled to create visual representations of the graph slices.

6. The invention of claim 5 wherein each layer has edges representing an equivalence class of edges at a previous layer.

7. The invention of claim 5 wherein the graphical engine requests graph slices from the computational engine in response to navigational commands from a user.

8. The invention of claim 5 wherein the computational engine and the graphical engine communicate across a communication network.

9. The invention of claim 5 wherein amount of storage needed to store the input multi-digraph is larger than storage capacity of the main memory.

* * * * *